US011022951B2

(12) United States Patent
Oho et al.

(10) Patent No.: US 11,022,951 B2
(45) Date of Patent: Jun. 1, 2021

(54) INFORMATION PROCESSING DEVICE AND INFORMATION PROCESSING METHOD

(71) Applicant: FANUC CORPORATION, Yamanashi (JP)

(72) Inventors: Yusaku Oho, Yamanashi (JP); Ryoutarou Tsuneki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/377,531

(22) Filed: Apr. 8, 2019

(65) Prior Publication Data
US 2019/0317469 A1 Oct. 17, 2019

(30) Foreign Application Priority Data
Apr. 12, 2018 (JP) ............................... JP2018-077077

(51) Int. Cl.
*G05B 19/29* (2006.01)
*G05B 19/402* (2006.01)
*G05B 19/418* (2006.01)
*G05B 13/02* (2006.01)

(52) U.S. Cl.
CPC ....... *G05B 19/291* (2013.01); *G05B 13/0265* (2013.01); *G05B 19/402* (2013.01); *G05B 19/41825* (2013.01)

(58) Field of Classification Search
CPC ................ G05B 19/291; G05B 19/402; G05B 19/41825; G05B 13/0265; G05B 2219/42152; G05B 19/19; G05B 13/042
See application file for complete search history.

(56) References Cited

U.S. PATENT DOCUMENTS

| 6,317,646 B1* | 11/2001 | de Caussin | G05B 19/40937 700/173 |
| 6,859,007 B2* | 2/2005 | Toyozawa | G05B 19/19 318/609 |
| 2004/0145333 A1* | 7/2004 | Toyozawa | G05B 19/19 318/632 |

(Continued)

FOREIGN PATENT DOCUMENTS

| JP | 04-362703 | 12/1992 |
| JP | 08-221132 | 8/1996 |

(Continued)

OTHER PUBLICATIONS

Notification of Reasons for Refusal dated Jun. 2, 2020 in corresponding Japanese Patent Application No. 2018-077077.

(Continued)

*Primary Examiner* — Ziaul Karim
(74) *Attorney, Agent, or Firm* — Wenderoth, Lind & Ponack, L.L.P.

(57) ABSTRACT

Learning related to a device having a driving unit is performed more easily. An information processing device includes: a storage unit that stores a machining program for operating a motor of a machine tool, a robot, or an industrial machine; and a generation unit that generates a learning program for performing learning based on operating characteristics of the motor by extracting a partial machining program including a characteristic element from the machining program stored in the storage unit.

6 Claims, 9 Drawing Sheets

(56) References Cited

U.S. PATENT DOCUMENTS

| | | | |
|---|---|---|---|
| 2012/0059506 A1* | 3/2012 | Okita | G05B 13/0265 |
| | | | 700/173 |
| 2012/0133311 A1* | 5/2012 | Kawai | H02P 6/181 |
| | | | 318/400.12 |
| 2014/0239868 A1 | 8/2014 | Monari et al. | |
| 2015/0312404 A1* | 10/2015 | Abramson | H04M 1/72569 |
| | | | 455/418 |
| 2015/0378347 A1* | 12/2015 | Sato | G05B 19/4063 |
| | | | 700/193 |
| 2016/0346885 A1* | 12/2016 | Ikai | B23Q 5/326 |

FOREIGN PATENT DOCUMENTS

| | | |
|---|---|---|
| JP | 11-143514 | 5/1999 |
| JP | 2000-33532 | 2/2000 |
| JP | 2003-316406 | 11/2003 |
| JP | 2011-134169 | 7/2011 |
| JP | 2012-58824 | 3/2012 |
| JP | 2013-191186 | 9/2013 |
| JP | 2016-130908 | 7/2016 |
| JP | 2017-117366 | 6/2017 |

OTHER PUBLICATIONS

Notification of Reasons for Refusal dated Oct. 13, 2020 in corresponding Japanese Patent Application No. 2018-077077.

* cited by examiner

INFORMATION PROCESSING DEVICE AND INFORMATION PROCESSING METHOD

This application is based on and claims the benefit of priority from Japanese Patent Application No. 2018-077077, filed on 12 Apr. 2018, the content of which is incorporated herein by reference.

BACKGROUND OF THE INVENTION

Field of the Invention

The present invention relates to an information processing device and an information processing method for performing information processing related to machine learning.

Related Art

Conventionally, the operating characteristics of devices having a driving unit, such as a machine tool, a robot, and an industrial machine have been learned by machine learning. By performing control based on the learning results of the machine learning, it is possible to control these devices more appropriately. A technology related to such machine learning is disclosed in Patent Document 1, for example. In the technology disclosed in Patent Document 1, a control system that processes a machining shape such as a circular arc shape, a polygonal shape, or a combination thereof performs learning control on the basis of a deviation or the like between a position command and a position feedback of a servo motor detected in every sampling cycle.
Patent Document 1: Japanese Unexamined Patent Application, Publication No. 2012-58824

SUMMARY OF THE INVENTION

However, the machine learning based on a positional deviation, for example, is preferably performed using a machining program itself that is actually used for machining works. However, it takes a considerable amount of time to perform learning by repeatedly operating the machining program that is actually used for machining works. Moreover, when the amount of data of the machining program that is actually used for machining works is large, it is necessary to prepare a large-capacity memory or the like in order to perform learning.

The present invention has been made in view of such a circumstance, and an object thereof is to provide an information processing device and an information processing method for performing learning related to devices having a driving unit more easily.

(1) An information processing device (for example, a program generation device 400 to be described later) according to the present invention includes: a storage unit (for example, a machining program storage region 403 to be described later) that stores a machining program for operating a motor (for example, a motor 201 and a motor 202 to be described later) of a machine tool, a robot, or an industrial machine; and a generation unit (for example, a learning program generation unit 405 to be described later) that generates a learning program for performing learning based on operating characteristics of the motor by extracting a partial machining program including a characteristic element from the machining program stored in the storage unit.

(2) The information processing device according to (1) may further include: a learning unit (for example, a learning unit 302 to be described later) that operates the motor on the basis of the learning program generated by the generation unit and performs learning based on the operating characteristics of the motor; and an adjustment unit (for example, an optimization action information output unit 305 to be described later) that adjusts control parameters of the motor on the basis a learning result obtained by the learning unit.

(3) In the information processing device according to (1) or (2), as the partial machining program including the characteristic element, the generation unit may extract a machining program including at least one of: a machining program for causing the motor to perform an operation involving reversal of a motor speed, a machining program for causing the motor to perform an operation involving a switching from a stopped state to a moving state and a switching from a moving state to a stopped state, and a machining program for causing the motor to perform an operation involving a change in acceleration without involving reversal of a motor speed.

(4) In the information processing device according to (1) or (2), the generation unit may extract a machining program for causing the motor to perform an operation in which a positional deviation exceeds a threshold when the motor is operated as the partial machining program including the characteristic element.

(5) In the information processing device according to (4), the generation unit may determine whether the positional deviation exceeds a threshold on the basis of a result obtained when the motor is operated on the basis of the machining program.

(6) In the information processing device according to (1) or (2), the generation unit may extract a partial machining program designated by a user who has referred to information indicating a change in positional deviation in a time-series manner or information on a moving trajectory of the operation of the motor as the partial machining program including the characteristic element.

(7) The information processing device according to any one of (1) to (6) may further include: a display unit (for example, a user interface unit 406 to be described later) that displays the partial machining program extracted by the generation unit.

(8) An information processing method according to the present invention is an information processing method executed by a computer (for example, a program generation device 400 to be described later), including: a storage step of storing a machining program for operating a motor (for example, a motor 201 and a motor 202 to be described later) of a machine tool, a robot, or an industrial machine; and a determination step of generating a learning program for performing learning based on operating characteristics of the motor by extracting a partial machining program including a characteristic element from the machining program stored in the storage step.

According to the present invention, it is possible to provide an information processing device and an information processing method for performing learning related to devices having a driving unit more easily.

DETAILED DESCRIPTION OF THE INVENTION

Hereinafter, an embodiment of the present invention will be described with reference to the drawings. In the present embodiment, a partial machining program including characteristic elements is extracted from a machining program for operating a motor of a machine tool, a robot, or an industrial machine to generate a learning program for performing learning based on the operating characteristics of the motor. Moreover, in the present embodiment, learning is performed using a learning program generated so as to include the characteristic elements rather than the machining program itself. For example, a learning program is operated by a computerized numerical controller (CNC) device that is a control device to perform feedforward control on a motor to thereby perform learning on control parameters related to feedforward control.

In the present embodiment, since a learning program is generated so as to include characteristic elements and learning is performed, much more learning can be performed in a short time as compared to a case in which learning is performed using a machining program itself used actually for machining works. Moreover, since a learning program having a smaller amount of data than a machining program is used, it is possible to reduce the capacity of a memory necessary for performing learning. That is, according to the present embodiment, it is possible to perform learning related to a device having a driving unit (in this example, a motor) more easily.

<System Configuration>

Figure 1:
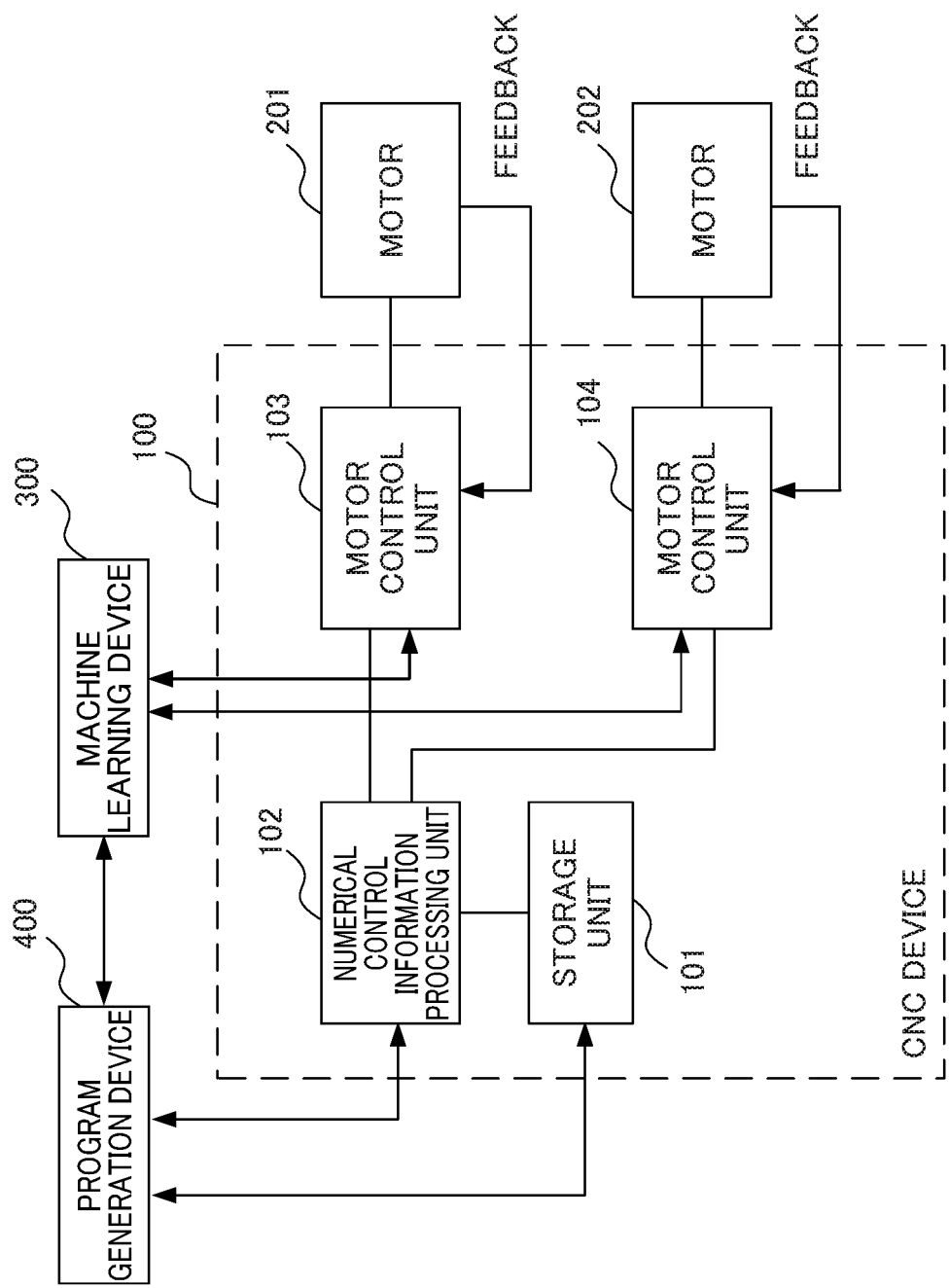
FIG. 1 is a block diagram illustrating a configuration of a CNC device, a motor, a machine learning device, and a program generation device operating according to a learning program of an embodiment of the present invention.

Prior to description of generation of the learning program, first, a configuration of an entire system including a CNC device operating according to a learning program will be described. FIG. 1 is a block diagram illustrating a configuration of a CNC device 100, a motor 201, a motor 202, a machine learning device 300, and a program generation device 400 according to an embodiment of the present invention. The CNC device 100, the machine learning device 300, and the program generation device 400 are communicably connected to each other. Moreover, the CNC device 100 is connected to the motors 201 and 202, which are control targets, so that a current command value (a torque command value) can be output to the motors 201 and 202. In the present embodiment, a case in which the machine learning device 300 performs adjustment (learning) of control parameters related to speed feedforward will be described by way of an example. However, the present invention is not limited thereto, and the present embodiment can be applied to adjustment (learning) of other control parameters. For example, the present embodiment can be also applied to adjustment (learning) of control parameters related to position feedforward, control parameters related to static friction, and control parameters related to backlash during reversal.

<CNC Device 100 and Motors 201 and 202>

The CNC device 100 includes a storage unit 101, a numerical control information processing unit 102, and motor control units 103 and 104 that form a servo control device. The CNC device 100 controls the motor 201 with the aid of the motor control unit 103 and controls the motor 202 with the aid of the motor control unit 104. Although the CNC device 100 is used in a machine tool, a robot, or an industrial machine, a case in which the CNC device 100 is used in a machine tool will be described by way of an example in the present embodiment.

The storage unit 101 stores a machining program. The machining program is a program for machining works actually by machining such as cutting machining or laser beam machining. A designer generates the machining program using a computer aided design (CAD) or a computer aided manufacturing (CAM) and stores the same in the storage unit 101.

The numerical control information processing unit 102 reads the machining program from the storage unit 101 and executes the read machining program during machining of works. Specifically, the numerical control information processing unit 102 sets a moving distance in an axial direction, a feedrate, and the like on the basis of codes included in the machining program so as to obtain a machining shape designated by the machining program and creates X-axis and Y-axis position command values.

The numerical control information processing unit 102 reads the learning program input from the program generation device 400 and executes the learning program during learning. Specifically, the numerical control information processing unit 102 sets a moving distance in the axial direction, the feedrate, and the like on the basis of the learning program and creates the X-axis and Y-axis position command values.

During both machining of works and learning, the numerical control information processing unit 102 outputs the generated X-axis position command value to the motor control unit 103. Furthermore, the numerical control information processing unit 102 outputs the generated Y-axis position command value to the motor control unit 104.

The motor control unit 103 creates a current command value (a torque command value) on the basis of the X-axis position command value and a position detection value fed back from the motor 201 and outputs the same to the motor 201. The motor control unit 104 creates a current command value (a torque command value) on the basis of the Y-axis position command value and a position detection value fed back from the motor 202 and outputs the same to the motor 202.

The motors 201 and 202 rotate on the basis of the current command values (torque command values) input from the motor control units 103 and 104, respectively. Ball screws are connected to the motors 201 and 202. The two ball screws connected to the motors 201 and 202 convert the rotational motion of the motors 201 and 202 to a linear motion to drive a table in the X-axis direction and the Y-axis direction. In this way, the motor 201 drives the table on which a machining target work is mounted in the X-axis direction. Moreover, the motor 202 drives the table on which a machining target work is mounted in the Y-axis direction.

Although a case in which the number of axes controlled is two axes of the X and Y axes is described in this example, this is an example only, and three or more axes may be controlled. When three or more axes are controlled, a number of motors corresponding to the number of axes may be further provided. Moreover, a number of motor control units corresponding to the number of axes may be further provided. Moreover, a servo motor or a spindle motor, for example, can be used as the motors 201 and 202.

The rotational angular positions of the motors 201 and 202 are detected by position detection units (for example, rotary encoders) associated with the motors 201 and 202, and the detected signals are used as feedback speed detection values. The speed detection values are integrated and are used as feedback position detection values.

Figure 2:
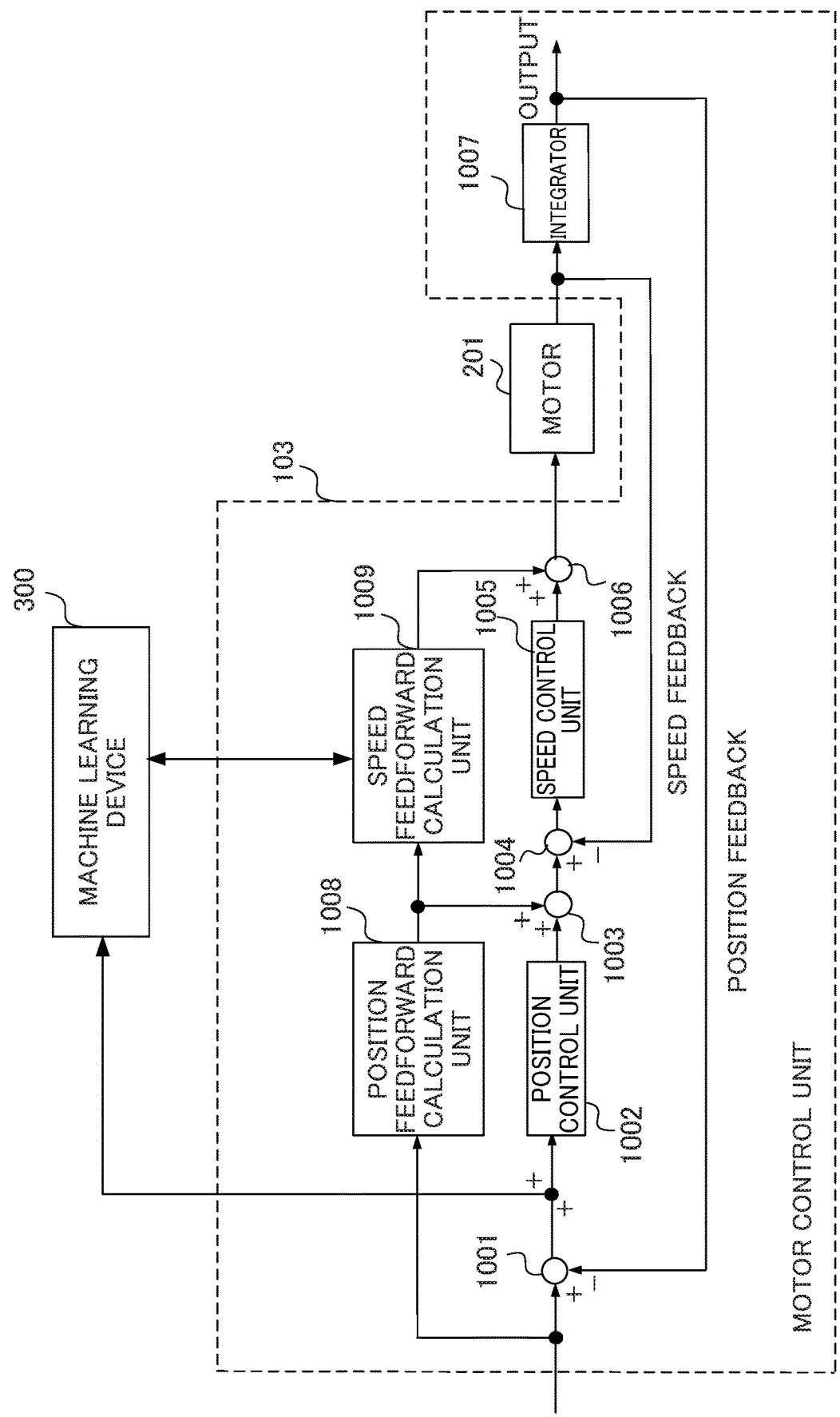
FIG. 2 is a block diagram illustrating a configuration example of a motor control unit.

More detailed configuration of the motor control units 103 and 104 will be described with reference to FIG. 2. The motor control unit 103 will be described by way of an example, and the motor control unit 104 has a similar configuration. Therefore, redundant description of the motor control unit 104 will be omitted. FIG. 2 is a block diagram illustrating a configuration example of the motor control unit 103. As illustrated in FIG. 2, the motor control unit 103 includes a subtractor 1001, a position control unit 1002, an adder 1003, a subtractor 1004, a speed control unit 1005, an adder 1006, an integrator 1007, a position feedforward calculation unit 1008, and a speed feedforward calculation unit 1009.

The numerical control information processing unit 102 creates a position command value on the basis of codes included in the machining program and a learning program to be described later and outputs the position command value to the subtractor 1001 and the position feedforward calculation unit 1008.

The subtractor 1001 calculates a difference between the position command value and the fed back position detection value and outputs the difference to the position control unit 1002 as a positional deviation. During learning, the positional deviation is also output to the machine learning device 300. When the machining program is operated after learning is performed according to the learning program, the positional deviation is not output to the machine learning device 300.

The position control unit 1002 outputs a value obtained by multiplying a position gain Kp with the positional deviation to the adder 1003 as a speed command value. The position feedforward calculation unit 1008 outputs a value obtained by differentiating the position command value and multiplying a feedforward coefficient therewith to the adder 1003 and the speed feedforward calculation unit 1009.

The adder 1003 adds the speed command value and an output value of the position feedforward calculation unit 1008 and outputs the addition result to the subtractor 1004 as a feedforward-controlled speed command value. The subtractor 1004 calculates a difference between the speed-feedback speed detection value and the output of the adder 1003 and outputs the difference to the speed control unit 1005 as a speed deviation.

The speed control unit 1005 adds a value obtained by multiplying an integral gain K1v with the speed deviation and a value obtained by multiplying a proportional gain K2v with the speed deviation and outputs the addition result to the adder 1006 as a torque command value.

The speed feedforward calculation unit 1009 performs a speed feedforward calculation process represented by a transfer function Gf(s) illustrated in Expression 1 (indicated by Math. 1 below), for example, and outputs the calculation result to the adder 1006.

$$Gf(s) = \frac{b_0 + b_1 s + b_2 s^2 + \cdots}{a_0 + a_1 s + a_2 s^2 + \cdots} \quad \text{[Math. 1]}$$

The adder 1006 adds the torque command value and the output value of the speed feedforward calculation unit 1009 and outputs the addition result to the adder 1006. The adder 1006 outputs the addition value to the motor 201 as a current command value (a torque command value).

The rotational angular position of the motor 201 is detected by a rotary encoder, which is a position detection unit and is associated with the motor 201, and the detected signal is used as a feedback speed detection value. The speed detection value is integrated by the integrator 1007 and is used as a feedback position detection value.

<Machine Learning Device 300>

In the present embodiment, a case in which the machine learning device 300 performs reinforcement learning as machine learning will be described by way of an example. However, the present invention is not limited thereto, and the machine learning device 300 may perform machine learning other than reinforcement learning. For example, machine learning such as supervised learning or semi-supervised learning may be performed. When the machine learning device 300 performs reinforcement learning as machine learning, the dimensions of the transfer function Gf(s) are set to predetermined values, and arbitrary values are set to the respective coefficients $a_i$ and $b_j$ (i and j≥0). After that, the learning program is operated by the CNC device 100 to observe the operating characteristics of the motors 201 and 202 operating by the control of the CNC device 100 related to the control parameters $a_i$ and $b_j$. By doing so, the machine learning device 300 can adjust (learn) the coefficients $a_i$ and $b_j$ that optimize the operating characteristics of the machine tool when the machine tool is operated by the learning program among a set of coefficients $a_i$ and $b_j$ set to arbitrary values. Therefore, the machine learning device 300 learns the control parameters $a_i$ an $b_j$ for feedforward correction using the position detection values fed back from the motors 201 and 202 and sets the control parameters optimal to the motor control units 103 and 104.

More specifically, the machine learning device 300 observes a state information S including the servo state such as commands and feedbacks including the positional deviation information as the operating characteristics of the CNC device 100 acquired by executing the learning program on the basis of the control parameters $a_i$ and $b_j$ (i and j≥0) to perform adjustment (action A) of the control parameters $a_i$ and $b_j$ related to the state S.

The value of a reward r is set to a negative value when the state information S is corrected to a state information S' by an action information A and the value of the positional deviation of the CNC device 100 operated on the basis of corrected control parameters $a_i'$ and $b_j'$ related to the state information S' is larger than the value of the positional deviation of the CNC device 100 operated on the basis of the control parameters $a_i$ and $b_j$ related to the state S before being corrected by the action information A. On the other hand, the value of the reward r is set to a positive value when the state information S is corrected to the state information S' by the action information A and the value of the positional deviation of the CNC device 100 operated on the basis of the corrected control parameters $a_i'$ and $b_j'$ related to the state information S' is smaller than the value of the positional deviation of the CNC device 100 operated on the basis of the control parameters $a_i$ and $b_j$ related to the state S before being corrected by the action information A.

The machine learning device 300 searches for the optimal action A in which a total future reward is maximized by trial-and-error learning. By doing so, the machine learning device 300 can select an optimal action A (that is, the optimal control parameters $a_i$ and $b_j$) with respect to the state S including the servo state such as command and feedbacks including the positional deviation information of the CNC device 100 acquired by executing the learning program on the basis of the control parameters $a_i$ and $b_j$. Machine learning by the machine learning device 300 will be described in more detail in Supplementary Explanation.

<Program Generation Device 400>

Figure 3:
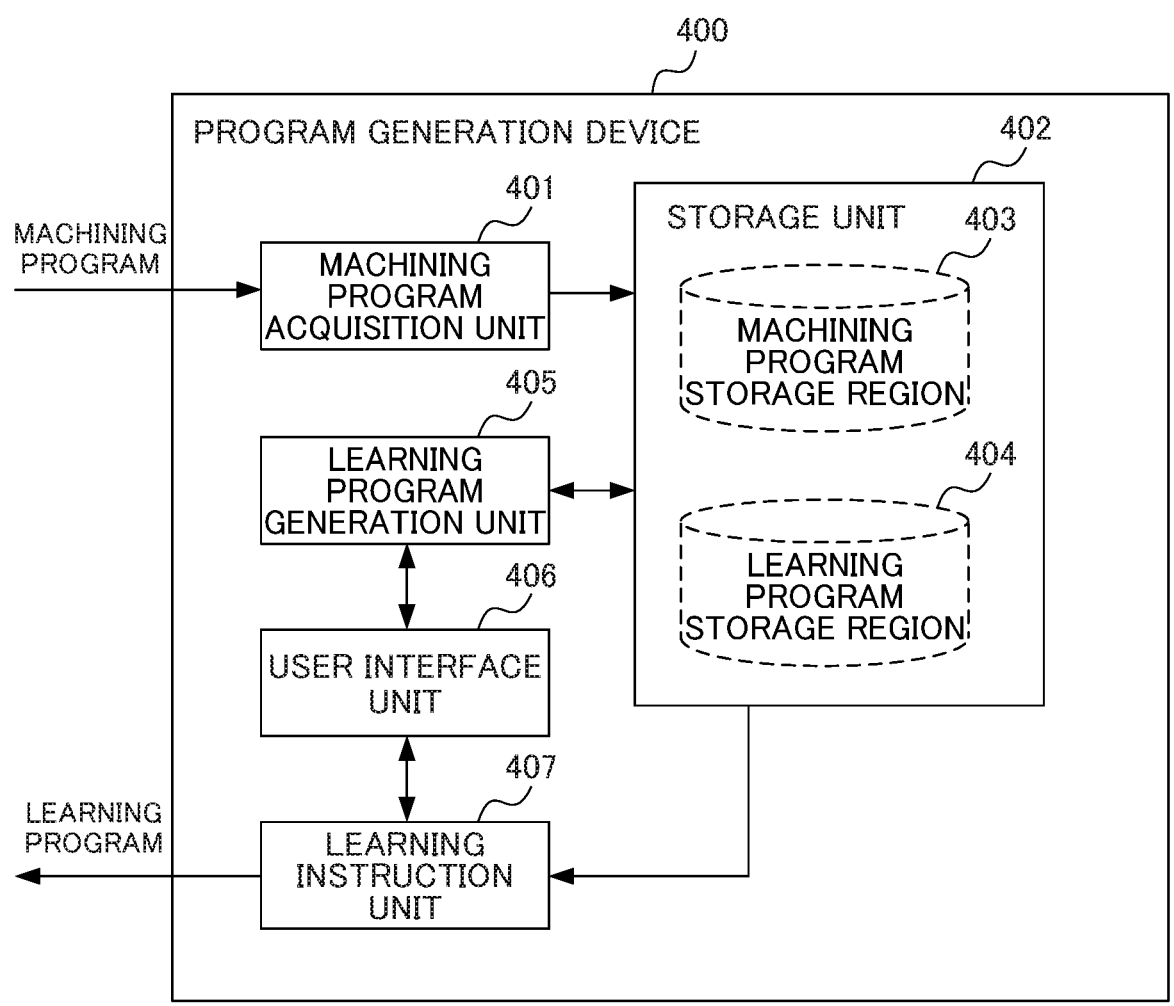
FIG. 3 is a block diagram illustrating a configuration example of a program generation device.

FIG. 3 is a block diagram illustrating a configuration of the program generation device 400. As illustrated in FIG. 3, the program generation device 400 includes a machining program acquisition unit 401, a storage unit 402, a machining program storage region 403, a learning program storage region 404, a learning program generation unit 405, a user interface unit 406, and a learning instruction unit 407. As described above, the program generation device 400 is a device that generates a learning program for performing learning based on the operating characteristics of the motors 201 and 202 by extracting a partial machining program including the characteristic elements from a machining program.

The machining program acquisition unit 401 acquires a machining program stored in the storage unit 101. Moreover, the machining program acquisition unit 401 stores the acquired machining program in the machining program storage region 403 provided in the storage unit 402.

The storage unit 402 is a storage unit that has the machining program storage region 403 and the learning program storage region 404. The storage unit 402 stores the machining program input from the machining program acquisition unit 401 in the machining program storage region 403. Moreover, the storage unit 402 stores the learning program generated by the learning program generation unit 405 in the learning program storage region 404.

The learning program generation unit 405 generates a learning program for performing learning based on the operating characteristics of the motors 201 and 202 by extracting a partial machining program including the characteristic elements from the machining program stored in the machining program storage region 403. Moreover, the learning program generation unit 405 stores the generated learning program in the learning program storage region 404. The details of how a learning program is generated by the learning program generation unit 405 will be described with reference to FIGS. 4 to 11.

The user interface unit 406 has a function of displaying a user interface for receiving operations from a user who uses the program generation device 400. Moreover, the user interface unit 406 has a function of receiving operations from a user who refers to the user interface. The operations of a user include an instruction to generate a learning program and an instruction to start machine learning using the generated learning program, for example. The user interface unit 406 outputs the received operation content to the learning program generation unit 405 and the learning instruction unit 407. The learning program generation unit 405 and the learning instruction unit 407 perform processing corresponding to the input operation content.

The learning instruction unit 407 instructs to start learning by the machine learning device 300. Specifically, the learning instruction unit 407 reads the learning program stored in the learning program storage region 404. The learning instruction unit 407 instructs to start learning by the machine learning device 300 by outputting the read learning program to the numerical control information processing unit 102.

The numerical control information processing unit 102 to which the learning program is input generates position command values of the X and Y axes on the basis of the input learning program instead of the machining program stored in the storage unit 101. The numerical control information processing unit 102 outputs the generated position commands to the motor control unit 103 and the motor control unit 104. In this way, the motors 201 and 202 start operations based on the learning program. Moreover, information (for example, a positional deviation in the present embodiment) indicating the operating characteristics of the motors 201 and 202 is output to the machine learning device 300. In this way, learning by the machine learning device 300 based on the learning program is realized.

In this manner, by generating a learning program from a partial machining program including the characteristic elements, it is possible to add the operating characteristics observed to adjust the control parameters $a_i$ and $b_j$ related to feedforward. Therefore, it is possible to adjust (learn) the control parameters $a_i$ and $b_j$ related to feedforward more accurately and efficiently.

<Generation of Learning Program>

Next, the details of generation of a learning program by the learning program generation unit 405 will be described. When adjusting (learning) the control parameters $a_i$ and $b_j$, the learning program generation unit 405 extracts a partial machining program including characteristic elements from the machining program. For example, the learning program generation unit 405 extracts a machining program including at least one of a machining program for causing the motor to perform an operation involving reversal of a motor speed, a machining program for causing the motor to perform an operation involving a switching from a stopped state to a moving state and a switching from a moving state to a stopped state, and a machining program for causing the motor to perform an operation involving a change in acceleration without involving reversal of a motor speed, as a partial machining program including the characteristic elements. The partial machining program including such characteristic elements is a machining program for machining a work in a shape such as a circular arc, a rectangle, and a rectangle with rounded corners R, for example. Here, the rectangle with rounded corners R means a rectangle of which the corners are circular arc-shaped.

The learning program generation unit 405 generates a learning program so as to include the extracted machining program. Here, the learning program generation unit 405 generates a learning program using only the extracted machining program when the learning program can be generated using the only extracted machining program.

However, the machining program is created to machine a work and is not created assuming that a portion thereof is extracted and used. Therefore, there is a case where it is not possible to operate the motors 201 and 202 appropriately using only the extracted machining program to perform learning. Therefore, in such a case, the learning program generation unit 405 generates the learning program by adding a program for performing a process (hereinafter referred to as pre-processing) necessary for executing the extracted machining program and a process (hereinafter referred to as "post-processing") necessary after the extracted machining program is executed to the extracted machining program.

The pre-processing is a process of driving a table on which a machining target work is mounted in the X-axis direction and the Y-axis direction to a position corresponding to a starting position of the extracted machining program, for example. Moreover, the pre-processing is a process of putting a tool into a state in which the extracted machining program can start, for example. Moreover, the post-processing is a process of driving the table on which a machining target work is mounted in the X-axis direction and the Y-axis direction to a position corresponding to an ending position of the machining program before extraction is performed. Moreover, the post-processing is a process of putting a tool into an ending state of the machining program before extraction is performed, for example.

Next, a specific example of which machining program is extracted as a partial machining program including the characteristic elements by the learning program generation unit 405 will be described with reference to FIG. 4 to 11. FIGS. 4 to 11 illustrate a machining shape based on the machining program. The machining shape corresponds to a shape of a moving trajectory of the control target work moving in the X and Y axes, driven by the motors 201 and 202. In the respective drawings, it is assumed that machining is performed in the clockwise direction. However, machining may be performed in the counter-clockwise direction in addition to the machining in the clockwise direction.

Figure 4:
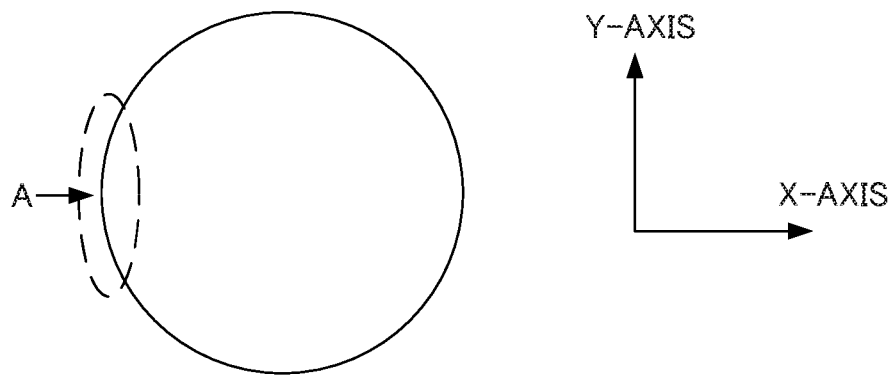
FIG. 4 is an explanatory diagram illustrating an example in which a machining shape is a circular arc (circular) shape.

When the machining shape is a circular arc (a circle), at point A illustrated in FIG. 4, for example, the rotation direction of a servo motor that moves a table in the X-axis direction is reversed and the table moves linearly in the X-axis direction in a reverse direction. That is, since the point A is a characteristic element involving a reversal in a motor speed, the learning program generation unit 405 extracts a machining program for performing machining of a work so as to obtain a machining shape including the point A (for example, a machining shape indicated by a broken line in the drawing) in order to generate a learning program.

Figure 5:
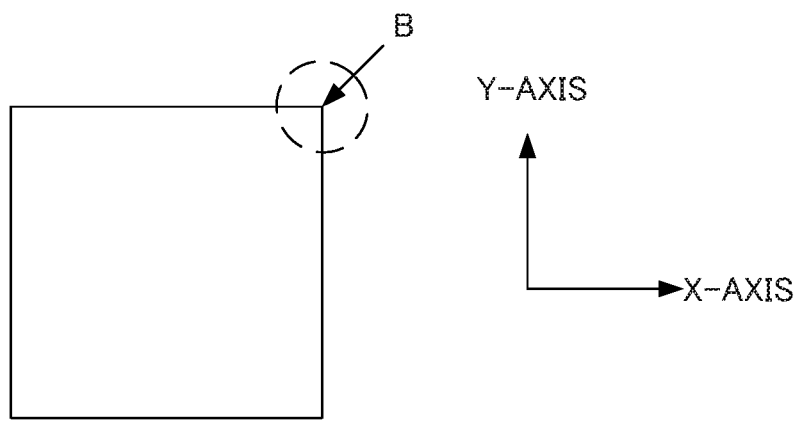
FIG. 5 is an explanatory diagram illustrating an example in which a machining shape is a rectangular shape.

When the machining shape is a rectangle, at a corner indicated by point B in FIG. 5, for example, a servo motor that moves the table in the Y-axis direction transitions from a stopped state to a rotating state, a servo motor that moves the table in the X-axis direction transitions from a rotating state to a stopped state, and the table transitions from a state of moving linearly in the X-axis direction to a state of moving linearly in the Y-axis direction. That is, since the point B is a characteristic element involving a switching from a stopped state to a moving state, the learning program generation unit 405 extracts a machining program for performing machining of a work so as to obtain a machining shape including the point B (for example, a machining shape indicated by a broken line in the drawing) in order to generate a learning program.

Figure 6:
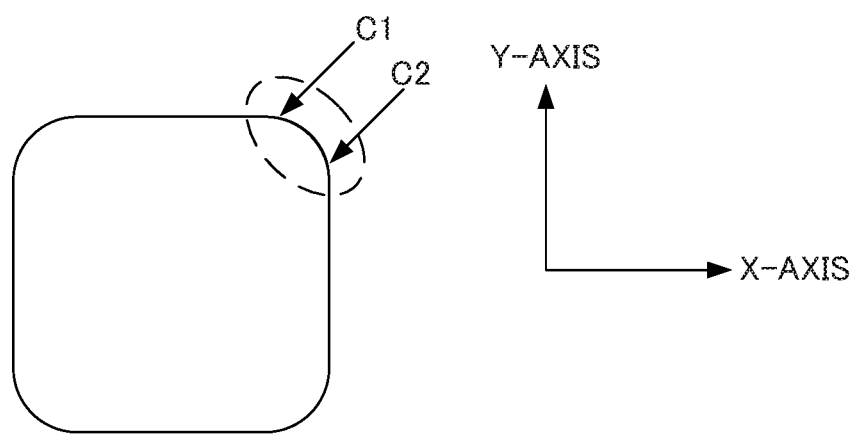
FIG. 6 is an explanatory diagram illustrating an example in which a machining shape is a rectangular shape with rounded corners R.

When the machining shape is a rectangle with rounded corners R, at point C1 illustrated in FIG. 6, for example, a servo motor that moves the table in the Y-axis direction transitions from a stopped state to a rotating state, and the table transitions from a state of moving linearly in the X-axis direction to a state of moving along a circular arc. Moreover, at point C2 illustrated in FIG. 6, a servo motor that moves the table in the X-axis direction transitions from a rotating state to a stopped state, and the table transitions from a state of moving along a circular arc to a state of moving linearly in the Y-axis direction. That is, since the point C is a characteristic element involving a switching from a stopped state to a moving state and a switching from a moving state to a stopped state, the learning program generation unit 405 extracts a machining program for performing machining of a work so as to obtain a machining shape including the point C (for example, a machining shape indicated by a broken line in the drawing) in order to generate a learning program. As described above, it is possible to evaluate coasting (running by inertia) that occurs when a rotation direction is reversed or when a motor transitions from a rotating state to a stopped state depending on a designated machining shape and to examine the influence on a positional deviation.

The learning program generation unit 405 may extract a partial machining program from machining programs corresponding to machining shapes in addition to these machining shapes, capable of observing the characteristics of an operation at a corner at which the rotation directions of the two motors are not reversed, an operation in a shape in which a motor starts moving in the same direction as before stopping from a stopped state, and an operation at a corner at which the rotation directions of the two motors are reversed. For example, the partial machining program may be extracted from machining programs corresponding to such machining shapes as illustrated in FIGS. 7 to 11.

Figure 7:
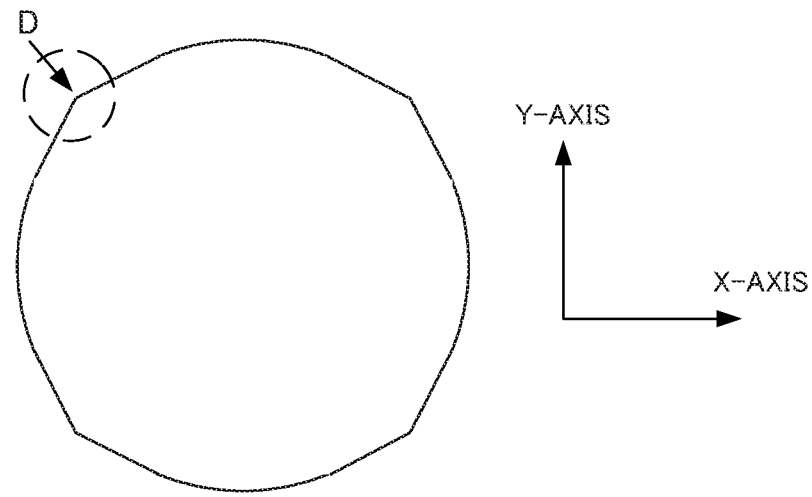
FIG. 7 is an explanatory diagram illustrating a first configuration example in which a machining shape is an octagonal shape of which some corners are circular arcs.

When the machining shape is an octagonal shape of which some corners are circular arcs, the speed changes discontinuously in addition to the operating characteristics during reversal on a circular arc at point D illustrated in FIG. 7, for example. That is, since the point D is a characteristic element involving a reversal in a motor speed and a change in acceleration, the learning program generation unit 405 extracts a machining program for performing machining of a work so as to obtain a machining shape including the point D (for example, a machining shape indicated by a broken line in the drawing) in order to generate a learning program.

Figure 8:
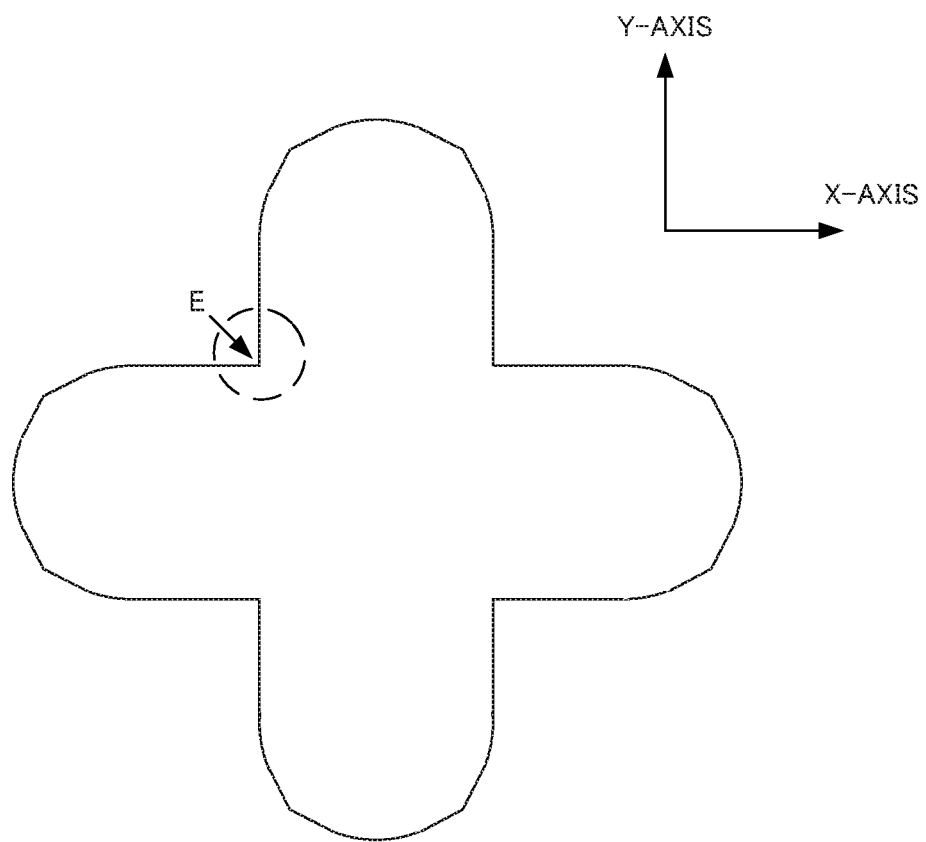
FIG. 8 is an explanatory diagram illustrating a second configuration example in which a machining shape is a cross shape in which a shape obtained by halving the octagon in which some corners are circular arcs is provided according to the first configuration example illustrated in FIG. 7 at respective ends.

When the machining shape is a cross shape in which a shape obtained by halving an octagon in which some corners are circular arcs is provided at respective ends, at point E illustrated in FIG. 8, for example, a motor that drives the X-axis transitions from a decelerating state to a stopped state and a motor that drives the Y-axis transitions from a stopped state to a rotating state. That is, since the point E is a characteristic element involving a change in acceleration without involving a reversal in a motor speed, the learning program generation unit 405 extracts a machining program for performing machining of a work so as to obtain a machining shape including the point E (for example, a machining shape indicated by a broken line in the drawing) in order to generate a learning program.

Figure 9:
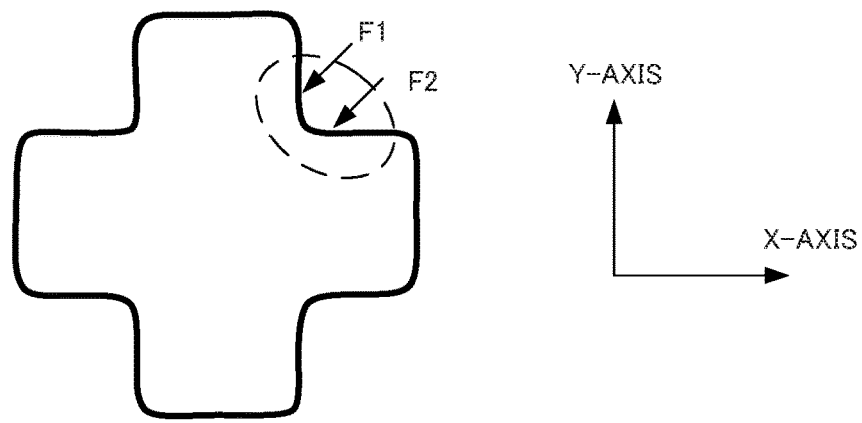
FIG. 9 is an explanatory diagram illustrating a third configuration example in which a machining shape is a cross shape with rounded corners R.

When the machining shape is a cross shape with rounded corners R, at point F1 illustrated in FIG. 9, for example, a motor that drives the X-axis performs switching to start rotating in the same direction as before stopping. Moreover, at point F2, a motor that drives the Y-axis performs switching to a stopped state when a motor that drives the X-axis rotates in the same direction as before stopping. That is, since the points F1 and F2 are characteristic elements involving a switching from a stopped state to a moving state and a switching from a moving state to a stopped state, the learning program generation unit 405 extracts a machining program for performing machining of a work so as to obtain a machining shape including the points F1 and F2 (for example, a machining shape indicated by a broken line in the drawing) in order to generate a learning program.

Figure 10:
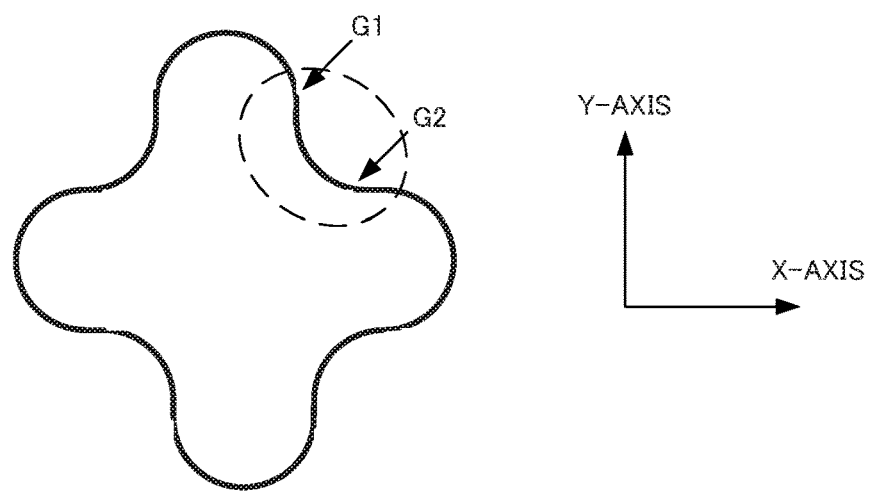
FIG. 10 is an explanatory diagram illustrating a fourth configuration example in which a machining shape is a cross shape including convex circular arcs and concave circular arcs.

When the machining shape is a cross shape including convex circular arcs and concave circular arcs, at point G1 illustrated in FIG. 10, for example, a motor that drives the X-axis starts rotating in the same direction immediately after the motor stops rotating. Moreover, at point G2, a motor that drives the Y-axis starts rotating in the same direction immediately after the motor stops rotating. That is, since the points G1 and G2 are characteristic elements involving a switching from a stopped state to a moving state and a switching from a moving state to a stopped state, the learning program generation unit 405 extracts a machining program for performing machining of a work so as to obtain a machining shape including the points G1 and G2 (for example, a machining shape indicated by a broken line in the drawing) in order to generate a learning program.

Figure 11:
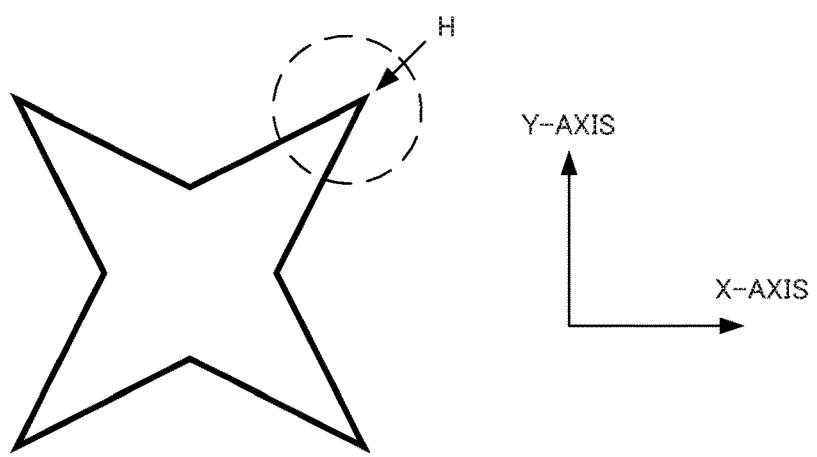
FIG. 11 is an explanatory diagram illustrating a fifth configuration example in which a machining shape is a star shape.

When the machining shape is a star shape, at point H illustrated in FIG. 11, for example, the rotation directions of both a motor that drives the X-axis and a motor that drives the Y-axis are reversed. That is, since the point H is a characteristic element involving a reversal in a motor speed, the learning program generation unit 405 extracts a machining program for performing machining of a work so as to obtain a machining shape including the point H (for example, a machining shape indicated by a broken line in the drawing) in order to generate a learning program.

As described above, the learning program generation unit 405 extracts a machining program including at least one of a machining program for causing the motor to perform an operation involving reversal of a motor speed, a machining program for causing the motor to perform an operation involving a switching from a stopped state to a moving state and a switching from a moving state to a stopped state, and a machining program for causing the motor to perform an operation involving a change in acceleration without involving reversal of a motor speed, as a partial machining program including the characteristic elements.

By operating the motors 201 and 202 according to a learning program created on the basis of such characteristic elements, it is possible to obtain operating characteristics for observing in order to adjust the control parameters $a_i$ and $b_j$ related to speed feedforward. Therefore, it is possible to learn the control parameters $a_i$ and $b_j$ related to speed feedforward more accurately and efficiently. Even when learning is performed on the basis of only some characteristic elements, the problem of overfitting or the like does not occur practically. This is because a control structure of the CNC device 100 is designed to be stable in a wide range.

As described above, in the present embodiment, a partial machining program including characteristic elements is extracted from a machining program for operating a motor of a machine tool, a robot, or an industrial machine to generate a learning program for performing learning based on the operating characteristics of the motor. Moreover, in the present embodiment, learning is performed using a learning program generated so as to include the characteristic elements rather than the machining program itself. For example, a learning program is operated by a computerized numerical controller (CNC) device that is a control device to perform feedforward control on the motors 201 and 202 to thereby perform learning on control parameters related to feedforward control.

In the present embodiment, since a learning program is generated so as to include characteristic elements and learning is performed, much more learning can be performed in a short time as compared to a case in which learning is performed using a machining program itself that is used actually for machining works. Moreover, since a learning program having a smaller amount of data than a machining program is used, it is possible to reduce the capacity of a memory necessary for performing learning. Therefore, the present embodiment can be realized in a device such as an assembling device having a small memory capacity, for example. That is, according to the present embodiment, learning related to a device having a driving unit (in this example, a motor) can be performed more easily.

The above-described embodiment is a preferred embodiment of the present invention. However, the scope of the present invention is not limited to the embodiment only and the present invention can be embodied in various modifications without departing from the spirit of the present invention. For example, the above-described embodiment can be embodied in a form in which various changes are made as in the following modifications to be described.

First Modification

In the above-described embodiments, it is assumed that learning is performed by a learning program created on the basis of various characteristic elements as illustrated in FIGS. 4 to 11, for example. However, the present invention is not limited thereto, and various characteristic elements may be classified into same or similar characteristic elements, and learning may be performed for respective classified characteristic elements. That is, separate learning models may be constructed for respective classified characteristic elements.

In this case, a number of machine learning devices 300 corresponding to the number of learning models to be constructed are prepared. Alternatively, a machine learning device 300 having a number of learning units corresponding to the number of learning models to be constructed is prepared. The learning program generation unit 405 classifies various characteristic elements into same or similar characteristic elements and generates a learning program for each of the classified characteristic elements. Moreover, the learning program generation unit 405 causes different machine learning devices 300 (or different learning units) to perform learning according to a plurality of learning programs created for the respective classified characteristic elements. In this way, separate learning models are constructed for the respective classified characteristic elements.

When parameters are adjusted using a learning model during machining based on a machining program, the numerical control information processing unit 102, for example, looks ahead the machining program before execution and determines which characteristic element is included in the machining program. The numerical control information processing unit 102 selects a learning model to be used for adjusting parameters on the basis of a determination result. In this way, it is possible to construct learning models corresponding to the classified characteristic elements and to use a learning model corresponding to the characteristic element included in the machining program.

The function of looking ahead the machining program and selecting the learning model may be included in the numerical control information processing unit 102 as described above, and a functional block having such a function may be provided in the machine learning device 300 or the program generation device 400.

Second Modification

In the above-described embodiment, the learning program generation unit 405 reads a machining program and extracts a portion including a characteristic element from the read machining program to generate a learning program when the portion including the characteristic element is present in the machining program. That is, the learning program is generated by analyzing the machining program. However, the present invention is not limited thereto, and a machining program may be operated actually to obtain the operating characteristics at the operation time and a learning program may be generated on the basis of the operating characteristics.

In this case, for example, the learning program generation unit 405 operates a machining program actually and acquires information (for example, a positional deviation or a speed deviation detected by the CNC device 100) indicating the operating characteristics at the operation time. The learning program generation unit 405 extracts, for example, a machining program of a portion corresponding to an operation that results in a large positional deviation or a large speed deviation to generate a learning program. In this way, a learning program can be generated with criteria different from the predetermined criteria such as "involving a reversal" or "involving a change in acceleration".

The determination of whether a positional deviation or a speed deviation is large may be realized in a way that a predetermined threshold is defined in advance, and when the positional deviation or the speed deviation detected by the CNC device 100 exceeds the predetermined threshold, the positional deviation or the speed deviation is determined to be large.

Third Modification

In addition to the processing of the above-described embodiment, the learning program generation unit 405 may output, to users, a part of an entire machining program to which the portion extracted from the machining program in order to generate the learning program corresponds. In this case, the output of the corresponding part to those other than users may be performed by displaying the corresponding part to the user interface unit 406, for example.

Figure 12:
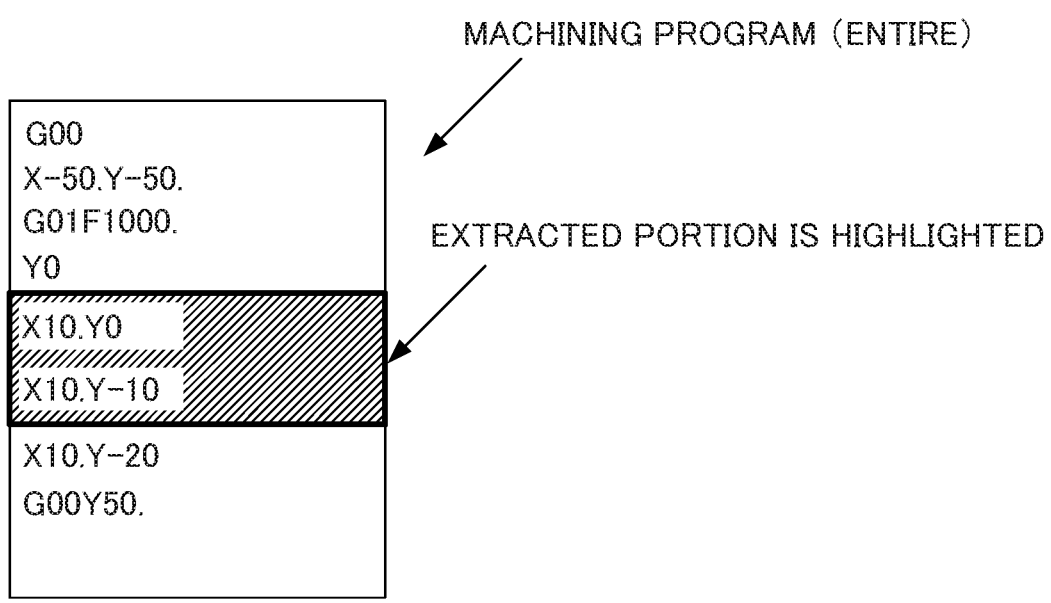
FIG. 12 is a schematic diagram illustrating an example of highlight display of a portion extracted from a machining program.

Although various displaying methods may be used, the portion extracted from the machining program may be displayed in a highlighted manner so as to be distinguishable from other portions. An example of highlight display is illustrated in FIG. 12. In the example illustrated in FIG. 12, the entire codes that form the machining program are displayed, and codes corresponding to the portion extracted from the machining program in order to generate the learning program are displayed in a highlighted manner. By referring to this display, a user can recognize the part of the entire machining program to which the portion extracted from the machining program corresponds. The display illustrated in FIG. 12 is an example and is not limited thereto.

For example, information indicating a change in deviation in a time-series manner may be displayed, and a part in the display corresponding to the portion extracted from the machining program in order to generate the learning program may be highlighted. As the information indicating the change in deviation in a time-series manner, waveform data in which the horizontal axis is a time and the vertical axis is a deviation (for example, a positional deviation or a speed deviation) may be used.

Information on a moving trajectory of the operation of a motor as illustrated in FIGS. 4 to 11, for example, may be displayed, and the part in the display corresponding to the portion extracted from the machining program in order to generate the learning program may be highlighted. For example, the broken-line portion illustrated in FIGS. 4 to 11 may be highlighted. Display other than the highlight display may be performed as long as the extracted portion can be distinguished from the other portions.

Fourth Modification

In the above-described embodiment, although the learning program generation unit 405 determines a portion to be extracted from the machining program, the portion to be extracted may be determined on the basis of a designation of an extraction portion designated by a user.

In this case, for example, as in the example illustrated in FIG. 12, the entire codes that form the machining program are displayed, and a designation of an extraction portion is received from a user who refers to the display via the user interface unit 406. The learning program generation unit 405 generates a learning program by extracting the machining program corresponding to a portion for which a designation is received. By doing so, it is possible to generate a learning program according to a user's intention.

The designation of the extraction portion from the user may be received by other methods. For example, information indicating a change in deviation in a time-series manner as described in the third modification may be displayed, and a designation of the extraction portion may be received from a user who refers to the display via the user interface unit 406.

Moreover, information on a moving trajectory of the operation of a motor as illustrated in FIGS. 4 to 11, for example, may be displayed, and a designation of the extraction portion may be received from a user who refers to the display via the user interface unit 406.

Other Modification

In the present embodiment, although machine learning capable of performing adjustment (learning) of control parameters $a_i$ and $b_j$ related to speed feedforward efficiently by observing operating characteristics of a machine tool when the machine tool is operated by a learning program has been illustrated, application of the learning program is not limited to adjustment (learning) of the control parameters $a_i$ and $b_j$ related to speed feedforward. For example, the present embodiment can be also applied to adjustment (learning) of control parameters related to position feedforward, control parameters related to static friction, and control parameters related to backlash during reversal. Although the machine learning device 300 observes a positional deviation as the operating characteristics by causing the CNC device 100 to execute the learning program, feedback information is not limited to the positional deviation but may include at least one of a position command and a position feedback (a position detection value) in addition to the positional deviation.

At least one of a speed command, a speed feedback, a speed deviation, a current command, a current feedback, and a current deviation may be added as an operation command. Here, the position command corresponds to the output of the numerical control information processing unit 102 and the position feedback corresponds to the output of the integrator 1007. The speed command corresponds to the output of the adder 1003, the speed feedback (the speed detection value) corresponds to the output of the rotary encoder associated with the motor, and the speed deviation corresponds to the output of the subtractor 1004. The current command corresponds to the output of the adder 1006, the current feedback corresponds to a detection value of the current supplied to the motor, and the current deviation corresponds to the output of the subtractor 1010.

Figure 13:
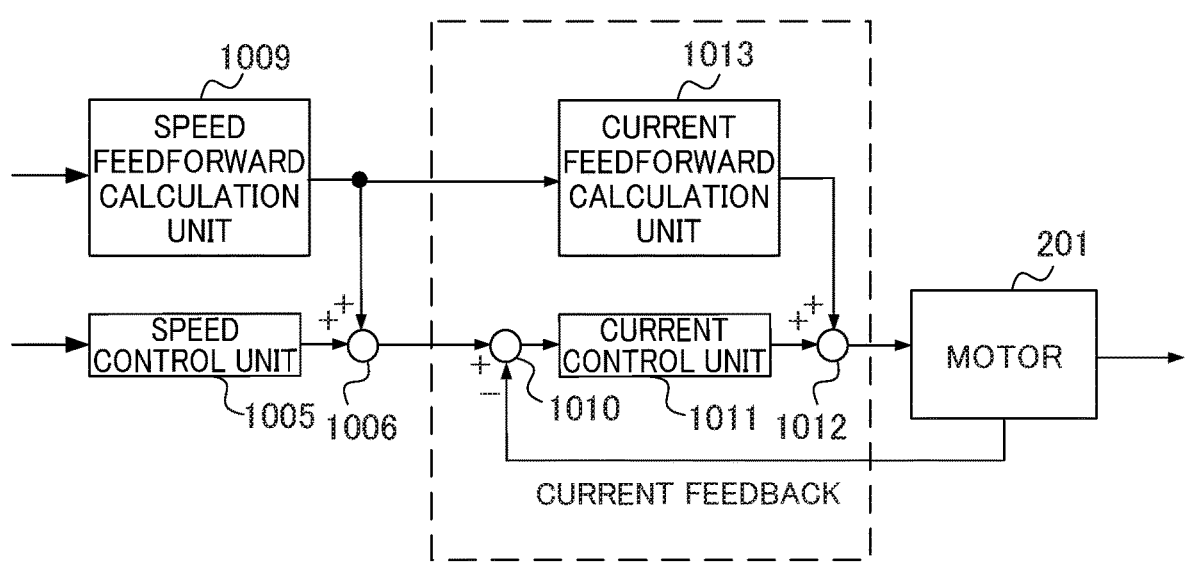
FIG. 13 is a block diagram illustrating a partial configuration of another configuration example of a CNC device.

The adjustment of feedforward is not limited to adjustment (learning) of the speed feedforward calculation unit 1009. For example, adjustment (learning) may be performed on the coefficients (control parameters) of a transfer function of the position feedforward calculation unit 1008 and/or a current feedforward calculation unit 1013 in addition to or instead of the speed feedforward calculation unit 1009. For example, FIG. 13 is a block diagram illustrating a partial configuration of another configuration example of the CNC device 100. FIG. 13 illustrates a CNC device in which a subtractor 1010, a current control unit 1011, an adder 1012, and a current feedforward calculation unit 1013 are added to the CNC device illustrated in FIG. 9. Rather than machine learning, an operator may input the control parameters $a_i$ and $b_j$ appropriately via a control and display panel, for example, to operate the learning program and observe operating characteristics so that the control parameters $a_i$ and $b_j$ are adjusted.

Adjustment (learning) of the control parameters related to backlash correction and/or backlash acceleration correction (instead of adjustment (learning) of the control parameters $a_i$ and $b_j$ related to feedforward) may be performed by observing the operating characteristics of a machine tool when operated by a learning program. For example, observation of the operating characteristics during reversal at the point A in the first and second configuration examples illustrated in FIGS. 7 and 8, respectively, and the operating characteristics during reversal at the point H in the fifth configuration example illustrated in FIG. 11 is particularly effective.

Adjustment (learning) of the control parameters related to static friction correction (instead of adjustment (learning) of the control parameters $a_i$ and $b_j$ related to feedforward) may be performed by observing the operating characteristics of a machine tool when operated by a learning program. For example, the operating characteristics at the point C in the second configuration example illustrated in FIG. 5 are particularly effective.

<Supplementary Explanation>

Figure 14:
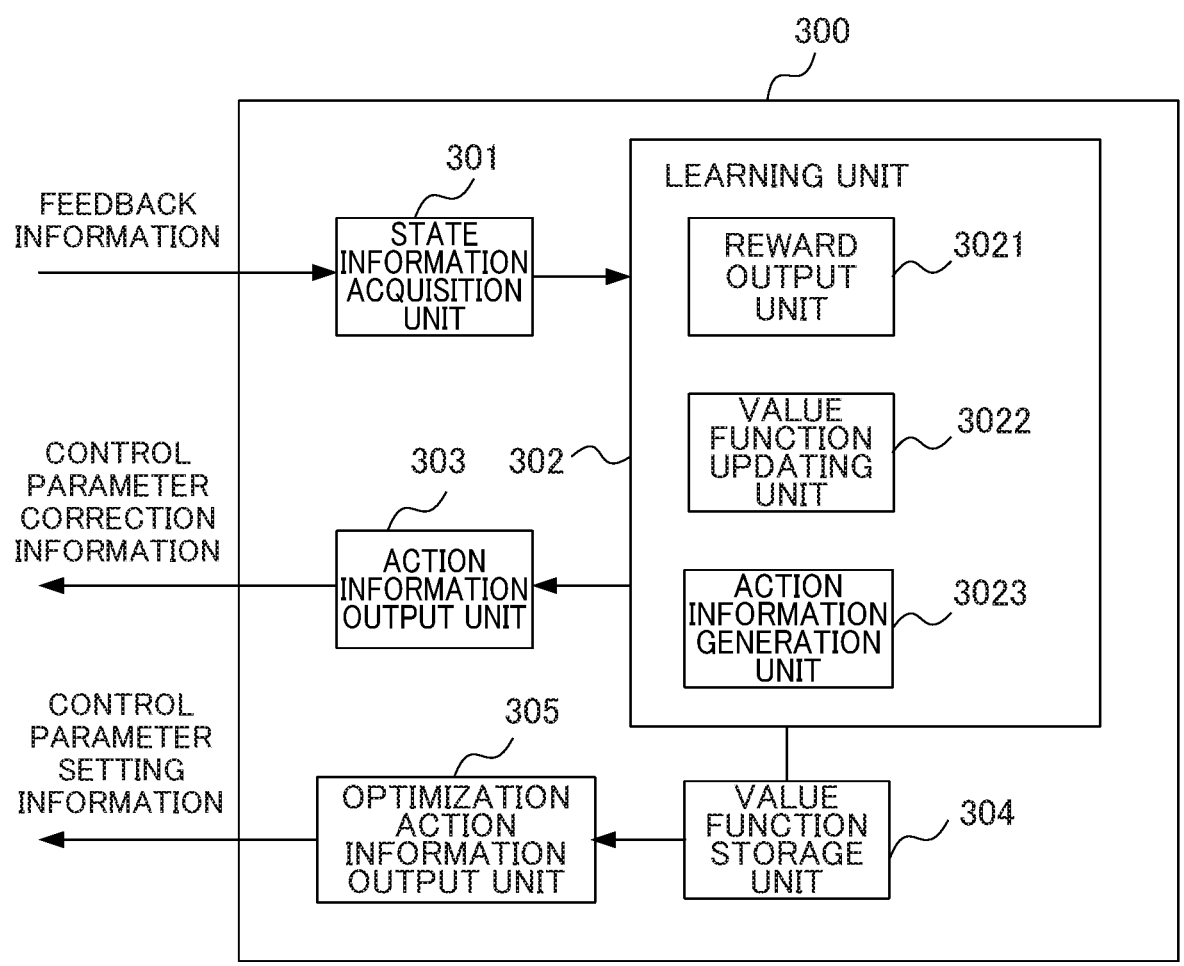
FIG. 14 is a block diagram illustrating a machine learning device 300 according to a first embodiment.

The machine learning (reinforcement learning) by the machine learning device 300 will be described in more detail as supplementary explanation. FIG. 14 is a block diagram illustrating the machine learning device 300 according to the first embodiment of the present invention. As illustrated in FIG. 14, in order to perform the reinforcement learning, the machine learning device 300 includes a state information acquisition unit 301, a learning unit 302, an action information output unit 303, a value function storage unit 304, and an optimization action information output unit 305. The learning unit 302 includes a reward output unit 3021, a value function updating unit 3022, and an action information generation unit 3023.

<Agent>

An agent (corresponding to the machine learning device 300 in the present embodiment) observes an environment state, selects a certain action, and changes the environment on the basis of the action. A certain reward is given according to the environmental change, and the agent learns selection (decision) for a better action.

<State S>

A state S is a servo state such as commands and feedbacks including the values of the coefficients $a_i$ and $b_j$ (i and j≥0) of the transfer function G(s) of the speed feedforward calculation unit 1009 of the CNC device 100 and the positional deviation information of the CNC device 100 acquired by executing the learning program during learning. The state information acquisition unit 301 acquires the state S.

<Action A>

An action A is adjustment (for example, the control parameters $a_i$ and $b_j$ are finely adjusted randomly) of the control parameters $a_i$ and $b_j$ of the speed feedforward calculation unit 1009 related to the state S. The control parameters $a_i$ and $b_j$ are set such that $a_0=1$, $a_1=0$, $b_0=0$, $b_1=$(an inertia value of a control target) in [Math. 1] as initial setting values, for example. The dimensions m and n of the coefficients $a_i$ and $b_j$ are set in advance. The action information generation unit 3023 of the learning unit 302 generates the action A and the action information output unit 303 outputs the action A in the state S to the CNC device 100.

<Reward r>

A set (a positional deviation set) of positional deviations that comprises state variables of the state S will be denoted by PD(S), and a positional deviation set that is state variables related to state information S' changed from the state S due to the action information A (correction of the coefficients $a_i$ and $b_j$ (i and j are 0 or positive integers) of the speed feedforward calculation unit) will be denoted by PD(S'). Moreover, the value of the positional deviation in the state S is a value calculated on the basis of a predetermined evaluation function f(PD(S)). The following functions can be used as the evaluation function f, for example. A function that calculates an integrated value of an absolute value of a positional deviation $$\int |e| dt$$

A function that calculates an integrated value by a weighting an absolute value of a positional deviation with time $$\int t|e| dt$$

A function that calculates an integrated value of a 2n-th power (n is a natural number) of an absolute value of a positional deviation $$\int e^{2n} dt \text{ (n is a natural number)}$$

A function that calculates a maximum value of an absolute value of a positional deviation $$\text{Max}\{|e|\}$$

In this case, the value of the reward r is set to a negative value when the value f(PD(s')) of the positional deviation of the CNC device 100 operated on the basis of the speed feedforward calculation unit 1009 after the correction related to the state information S' corrected by the action information A is larger than the value f(PD(s)) of the positional deviation of the CNC device 100 operated on the basis of the speed feedforward calculation unit 1009 before the correction related to the state information S before being corrected by the action information A.

On the other hand, the value of the reward r is set to a positive value when the value f(PD(s')) of the positional deviation of the CNC device 100 operated on the basis of the speed feedforward calculation unit 1009 after the correction related to the state information S' corrected by the action information A is smaller than the value f(PD(s)) of the positional deviation of the CNC device 100 operated on the basis of the speed feedforward calculation unit 1009 before the correction related to the state information S before being corrected by the action information A. Moreover, the value of the reward r is set to zero when the value f(PD(s')) of the positional deviation of the CNC device 100 operated on the basis of the speed feedforward calculation unit 1009 after the correction related to the state information S' corrected by the action information A is equal to the value f(PD(s)) of the positional deviation of the CNC device 100 operated on the basis of the speed feedforward calculation unit 1009 before the correction related to the state information S before being corrected by the action information A. The reward output unit 3021 of the learning unit 302 calculates the reward r when the action A is applied to the state S.

<Value Function Q>

A value of selecting an action A under a certain environment state S is defined as Q(S,A). That is, Q(S,A) is a function that receives the state S and the action A as an input. At an initial time at which the Q-learning starts, the correct value of the value Q(S,A) is not known at all for a combination of the state S and the action A. Therefore, the agent learns the correct value Q(S,A) by selecting various actions A under a certain state S and selecting a better action on the basis of rewards given for the selected actions A. An update expression of such a value Q(S,A) can be represented by Expression 2 below (Math. 2).

$$Q(S_{t+1}, A_{t+1}) \leftarrow$$ [Math. 2]
$$Q(S_t, A_{t+1}) + \alpha\left(r_{t+1} + \gamma \max_A Q(S_{t+1}, A) - Q(S_t, A_t)\right)$$

In Expression 2, $S_t$ indicates an environment state at time t, and $A_t$ indicates an action at time t. By the action $A_t$, the state changes to $S_{t+1}$.

$r_{t+1}$ indicates a reward obtained by the change in the state. Moreover, a term with max is a multiplication of the Q value by γ when an action A having the highest Q value known at that moment was selected under the state $S_{t+1}$. Here, γ is a parameter of 0<γ≤1 and is called a discount rate. Moreover, α is a learning coefficient and is in the range of 0<α≤1. A learning method of creating a value function Q(S,A) table for all state-action pairs (S, A) to perform learning is known. The value function updating unit 3022 of the learning unit 302 updates the value function Q stored in the value function storage unit 304 by performing learning on the basis of the state S, the action A, the state S' when the action A was applied to the state S, and the value of the reward r calculated by the reward output unit 3021.

In this way, by selecting such an action A that maximizes the value of Q(S,A) among the actions A applied to the respective coefficients $a_i$ and $b_j$ of the transfer function of the speed feedforward calculation unit 1009 related to a certain state S on the basis of the value function Q learned by the machine learning device 300, it is possible to select such an action A (that is, the coefficients $a_i$ and $b_j$ of the speed feedforward calculation unit 1009) that minimizes the positional deviation acquired by executing the learning program. The optimization action information output unit 305 generates optimization action information that is the action information A for causing the speed feedforward calculation unit 1009 to perform an operation that maximizes the value Q(S,A) on the basis of the value function Q updated by the value function updating unit 3022 performing learning. While the machine learning according to the present embodiment has been described as supplementary, the machine learning described herein is one example for observing evaluations obtained by a learning program and performing adjustment (learning), and the adjustment (learning) is not limited thereto. For example, an operator may adjust the control parameters using the learning program.

In the description of the embodiment, the functions of the CNC device 100, the machine learning device 300, and the program generation device 400 have been described. In order to realize these functions, the CNC device 100, the machine learning device 300, and the program generation device 400 each include an arithmetic processing unit such as a central processing unit (CPU). Moreover, the CNC device 100, the machine learning device 300, and the program generation device 400 each include an auxiliary storage device such as a hard disk drive (HDD) for storing various control programs such as application software or an operating system (OS) and a main storage device such as a random access memory (RAM) for storing data temporarily required when the arithmetic processing device executes a program.

In each of the CNC device 100, the machine learning device 300, and the program generation device 400, the arithmetic processing device reads an application software and an OS from the auxiliary storage device and develops the read application software and OS in the main storage device to perform arithmetic processing on the basis of the read application software and OS. The arithmetic processing device also controls various types of hardware provided in each device based on the arithmetic result. In this way, the functional blocks of the present embodiment are realized. That is, the present embodiment can be realized by cooperation of hardware and software.

Since the machine learning device 300 involves a large amount of computation associated with the machine learning, it is preferable to mount graphics processing units (GPUs) on a personal computer and to use a technique called general-purpose computing on graphics processing units (GPGPUs). By doing so, high-speed arithmetic processing can be realized when the GPU is used for arithmetic processing associated with machine learning. Furthermore, in order to perform faster processing, the machine learning device 300 may construct a computer cluster using a plurality of computers equipped with such GPUs and may perform parallel processing unit the plurality of computers included in the computer cluster.

In the above-described embodiment, the components included in the CNC device 100, the machine learning device 300, and the program generation device 400 may be realized by hardware, software, or a combination thereof. Here, being realized by software means being realized when a computer reads and executes a program.

The programs can be stored on any of various types of non-transitory computer readable media and be provided to a computer. The non-transitory computer readable media include various types of tangible storage media. Examples of the non-transitory computer readable media include a magnetic recording medium (for example a flexible disk, a magnetic tape, and a hard disk drive), a magneto-optical recording medium (for example a magneto-optical disk), a CD-ROM (Read Only Memory), a CD-R, a CD-R/W, a semiconductor memory (for example a mask ROM, a PROM (Programmable ROM), an EPROM (Erasable PROM), a flash ROM, and a RAM (Random Access Memory)). Moreover, the software may be supplied to a computer via various types of transitory computer readable media. Examples of transitory computer readable media include electrical signals, optical signals, and electromagnetic waves. The transitory computer readable media can supply programs to a computer via wired communication paths such as electrical wires and optical fibers, or a wireless communication path.

EXPLANATION OF REFERENCE NUMERALS

100: CNC (Computerized Numerical Control) device
101: Storage unit
102: Numerical control information processing unit
103, 104: Motor control unit
201, 202: Motor
300: Machine learning device
400: Program generation device
401: Machining program acquisition unit
402: Storage unit
403: Machining program storage region
404: Learning program storage region
405: Learning program generation unit
406: User interface unit
407: Learning instruction unit

What is claimed is:

1. An information processing device comprising:
a storage unit; and
one or more processors, wherein
the storage unit stores a machining program for operating a motor of a machine tool, a robot, or an industrial machine,
one of the one or more processors is configured to generate a learning program for performing machine learning on a control parameter including at least any one of a control parameter related to velocity feedforward, a control parameter related to position feedforward, a control parameter related to current feedforward, a control parameter related to static friction, and a control parameter related to backlash during reversal, based on operating characteristics of the motor by extracting, from the machining program stored in the storage unit, a portion of the machining program that causes the motor to perform an operation in which a positional deviation exceeds a threshold when the motor is operated as a partial machining program including a characteristic element, and
as the partial machining program including the characteristic element, the one of the one or more processors is configured to extract from the machining program at least one of:
a machining program portion for causing the motor to perform an operation involving reversal of a motor speed;
a machining program portion for causing the motor to perform an operation involving a switching from a stopped state to a moving state and a switching from a moving state to a stopped state; and
a machining program portion for causing the motor to perform an operation involving a change in acceleration without involving reversal of a motor speed.

2. The information processing device according to claim 1, wherein
one of the one or more processors is configured to operate the motor based on the learning program and perform learning based on the operating characteristics of the motor, and
one of the one or more processors is configured to adjust control parameters of the motor based on a learning result obtained by the learning.

3. The information processing device according to claim 1, wherein
the one of the one or more processors is configured to determine whether the positional deviation exceeds the threshold based on a result obtained when the motor is operated based on the machining program.

4. The information processing device according to claim 1, wherein
the one of the one or more processors is configured to extract a part of the machining program designated by a user who has referred to information indicating a change in positional deviation in a time-series manner or information on a moving trajectory of an operation of the motor as the partial machining program including the characteristic element.

5. The information processing device according to claim 1, further comprising:
a display unit that displays the partial machining program.

6. An information processing method executed by a computer, the information processing method comprising:
a storage step of storing a machining program for operating a motor of a machine tool, a robot, or an industrial machine; and
a generating step of generating a learning program for performing machine learning on a control parameter including at least any one of a control parameter related to velocity feedforward, a control parameter related to position feedforward, a control parameter related to current feedforward, a control parameter related to static friction, and a control parameter related to backlash during reversal, based on operating characteristics of the motor by extracting, from the machining program stored in the storage step, a portion of the machining program that causes the motor to perform an operation in which a positional deviation exceeds a threshold when the motor is operated as a partial machining program including a characteristic element,
wherein as the partial machining program including the characteristic element, the one of the one or more processors is configured to extract from the machining program at least one of:
a machining program portion for causing the motor to perform an operation involving reversal of a motor speed;
a machining program portion for causing the motor to perform an operation involving a switching from a stopped state to a moving state and a switching from a moving state to a stopped state; and
a machining program portion for causing the motor to perform an operation involving a change in acceleration without involving reversal of a motor speed.

* * * * *